Patented Aug. 14, 1934

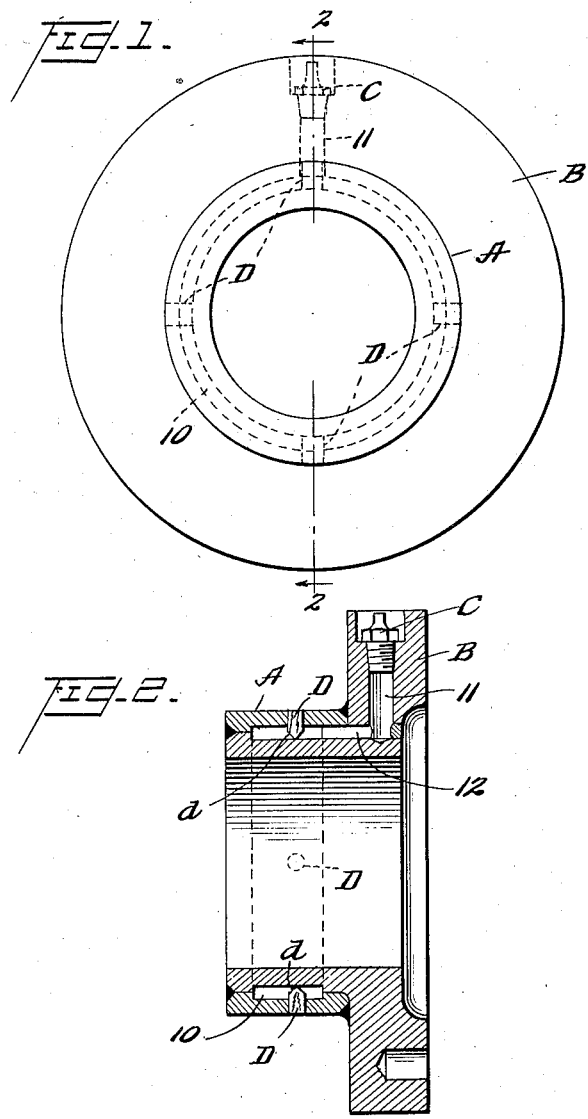

1,970,199

UNITED STATES PATENT OFFICE 1,970,199

BUSHING FOR LOCOMOTIVE VALVE MOTIONS

John Cessna Sharp, Chattanooga, Tenn., assignor to Nathan Manufacturing Company, New York, N. Y., a corporation of New York Application March 3, 1930, Serial No. 432,899

2 Claims. (Cl. 308—78)

This invention relates to a bushing or the like including in its structure an oil reservoir and rigid oil feeders of special nature constituting a means for automatically lubricating a part journaled upon said bushing. One instance illustrative of a practical utility of this invention is its application to or embodiment in a union link collar-bushing forming part of a locomotive valve motion or valve gear.

The primary purpose of the invention is to provide a bushing of self-lubricating nature in which the surface of the bushing will unfailingly be lubricated and with great economy in the consumption of lubricating oil. In pursuance of this purpose, one of the important objects of the invention is to provide a bushing which contains oil attracting and conducting elements characterized in that any hard foreign substances which may be suspended in the oil will be separated from the oil and only the clean oil delivered to the surface to be lubricated and which delivery will be continuous and unfailing and in amounts so minute as to result in a great economy in respect of the oil consumed.

More particularly stated, one of the important objects of the invention is to provide a union link collar-bushing, or the like, of a self-lubricating nature and characterized in that lubricating oil freed from hard and gritty substance will be fed in minute amounts to the surface to be lubricated and without liability of stoppage of the feeding of the oil to said surface due to clogging of the passages of the oil feeding elements and/or of charring or glazing of the discharge ends of said elements.

Another object of the invention is to so construct the bushing that it may be conveniently supplied with oil under heavy pressure and, in fact, may form a part of a centralized system in which the oil in the bushing is renewed at the same time that other parts of a mechanism including the bushing are supplied with oil.

Having thus in a general way set forth the purposes and nature of the invention, I will now describe a practicable embodiment thereof, reference being had to the accompanying drawing in which:

Fig. 1 is an end elevation of a union link collar-bushing constructed in accordance with the invention; and Fig. 2 is a vertical section thereof on the line 2—2 of Fig. 1.

Referring to the drawing A designates the body of a bushing formed at one end with a flange B. A rotative part, not shown, is in practice mounted upon said body A. The wall of the body A is formed with an oil reservoir 10 and the flange B is formed with a duct or channel 11 whose inner end is in communication through a port or channel 12 with the reservoir 10. The duct or channel 11 is normally closed by a suitable oil inlet fitting C of the pressure type, that is, of a type which includes a check valve which is automatically opened under pressure suitably applied thereto to admit oil to the reservoir 10, either in the original filling of the reservoir or in replacing oil which has been consumed in the lubricating operation, and is automatically closed when relieved of such pressure. The "Zerk" inlet fitting, so called, (comprising a check valve normally held to its seat by the pressure of a spring and adapted to be forced from its seat by pressure sufficient to overcome the tension of the spring) is representative of the pressure fitting referred to and being known and since its details form no part of the instant invention, it has been considered to be unnecessary to illustrate it in detail.

The oil attracting and conducting elements, hereinbefore referred to, are in the form of pegs or plugs designated D in the accompanying drawing. Each extends from the inner wall of the reservoir and across said reservoir and through the outer wall of the body of the bushing to the outer surface of the latter. Its outer end portion is tightly fitted, under pressure, in the outer wall of the bushing-body A. Its portion within the reservoir is suitably cut away as shown at $d$ to permit oil to enter from the reservoir notwithstanding that its inner end is tightly engaged with the inner wall of the reservoir. By thus contacting the inner end of each plug with the inner wall of the reservoir and tightly mounting its outer end in the outer wall of the bushing, the plug is held against displacement under the jars to which it is subjected in use and also against displacement from the pressure of the oil supplied in the replenishing of oil in the reservoir. In the latter operation, the plugs act as vents, relieving the pressure within the reservoirs and permitting the reservoir to be filled with oil.

The pegs or plugs employed by me are those set forth and claimed in my co-pending application for Letters Patent filed December 11, 1922 and numbered 606,332, and which has matured into Letters Patent No. 1,804,234, dated May 5, 1931. I have found in the practice of the method set forth in my aforesaid application and patent that the plugs which sink to the bottom of the bath serve perfectly while those which persistently float should be discarded if perfect results are expected. When the plugs or rounded strips of wood from which the plugs are to be formed are first immersed in the hot bath, there is a very pronounced agitation of the oil which forms the bath, presumably due to the release of gases or liquid substances contained in the wood. When this agitation ceases, as it does after a short time, the strips or plugs may be removed from the hot bath and placed in a separate bath of unheated oil. Those which sink to the bottom may then be removed, since they have thereby demonstrated that they will act perfectly as oil attracting and conducting elements which will unfailingly and continuously feed for indefinitely prolonged periods the oil in minute amounts to the surface to be lubricated, and will separate hard foreign substances and the like from the oil fed to said surface, and be free from liability to become clogged with impurities and also be free from liability to the formation of a glaze over their discharge ends.

In addition to the improvement in the oil attracting and conducting qualities resulting from the treatment above described the plugs or strips are preserved and the plugs may be used immediately or at any future date, being capable of retaining the oil with which they have become saturated or impregnated even when not immersed in oil.

It will be noticed that the construction described is simple and inexpensive and is very economical in the use of oil and effective in respect of lubricating qualities; since only clean and filtered oil is fed to the surface to be lubricated and such oil is fed unfailingly and for indefinite periods without any attention whatsoever except the replenishment of the supply of oil in the reservoir when the latter has become exhausted. In this replenishment a means which forces the oil into the reservoir under heavy pressure may be employed without danger of displacing any of the plugs, since the latter have their outer end portions rigidly secured in the outer wall of the body of the bushing and their inner extremities in contact with the inner surface of the inner wall of said body. Thus, when the body of the bushing is encircled by a part to be lubricated, said part co-operates with the described correlation of plugs and bushing body in holding the plugs against any danger of displacement, either from an internal force or from external jars to which the bushing may be subjected as a part of a locomotive valve motion. When the oil is replenished through the medium of a high pressure refilling device, the plugs themselves may act as vents to a certain extent, thereby relieving pressure within the reservoir.

Having thus described the invention, what I believe to be new and therefore claim, is:—

1. A bushing of the character described, comprising a hollow body formed of concentrically arranged members which are spaced from each other to provide an oil reservoir therebetween, the outer of said members having a series of openings, a flange which closes one end of said reservoir and is adapted to lie against a device mounted on said body, said flange having an internal oil channel which extends through its outer periphery and opens at its inner end into said reservoir, means closing the other end of said reservoir, and a series of oil-saturated plugs whose inner ends are submerged in the oil in said reservoir and whose outer ends extend through the openings in the outer member of the body of the bushing and are tightly fitted in the latter, each of said plugs being characterized by its ability to attract and conduct oil in minute amounts outward from the reservoir to the outer surface of the bushing and to exclude the passage of gritty matter to said surface, and by its freedom from becoming clogged, charred, or glazed, and by its ability to sink in oil.

2. A bushing according to claim 1 in which a pressure fitting is mounted in the outer end of the oil channel in the flange and the outer ends of the plugs are compressed in the openings in the outer member of the body of the bushing to prevent rapid flow of oil to the surface to be lubricated and to prevent their being displaced by the pressure exerted thereagainst in the supplying of oil to the reservoir and under the jars to which they are subjected in use.

JOHN CESSNA SHARP.